United States Patent [19]

Oguri et al.

[11] 4,388,257

[45] Jun. 14, 1983

[54] PROCESS FOR PREPARING CALCIUM SILICATE SHAPED PRODUCT

[75] Inventors: Yasuo Oguri, Tokyo; Mitsuru Awata, Kodaira; Mitsunobu Abe, Yokohama, all of Japan

[73] Assignee: Mitsubishi Chemical Industries Ltd., Tokyo, Japan

[21] Appl. No.: 227,696

[22] Filed: Jan. 23, 1981

[30] Foreign Application Priority Data

Feb. 4, 1980 [JP] Japan .................... 55-12162

[51] Int. Cl.³ .................................. B28B 1/26
[52] U.S. Cl. .............................. 264/82; 106/86; 106/120; 264/86; 264/234; 264/333
[58] Field of Search ............ 264/86, 333, 234, 82; 106/85, 120

[56] References Cited

U.S. PATENT DOCUMENTS

| | | | |
|---|---|---|---|
| 3,238,052 | 3/1966 | Buraks | 106/120 |
| 3,501,324 | 3/1970 | Kubo | 106/120 |
| 3,679,446 | 7/1972 | Kubo | 106/120 |
| 3,928,539 | 12/1975 | Satoh | 423/326 |
| 4,193,958 | 3/1980 | Uchida | 264/86 |

FOREIGN PATENT DOCUMENTS 763327  7/1967  Canada .................... 106/120

*Primary Examiner*—John A. Parrish
*Attorney, Agent, or Firm*—Oblon, Fisher, Spivak, McClelland & Maier

[57] ABSTRACT

A calcium silicate shaped product is prepared by forming an aqueous slurry of calcium silicate hydrate by reacting a calcareous source with a siliceous source in water as a dispersion under heating; molding said aqueous slurry to form a molded product having a bulk density of less than 0.6 g/cm3; curing said molded product, in a closed tank having a capacity of 1.5 to 30 times of the volume of said molded product at 140° to 300° C. by dry-heating without feeding steam, and drying the product.

9 Claims, No Drawings

PROCESS FOR PREPARING CALCIUM SILICATE SHAPED PRODUCT

BACKGROUND OF THE INVENTION

1. Field of the Invention

The present invention relates to a process for preparing a shaped calcium silicate product. More particularly, it relates to a process for preparing a shaped calcium silicate product which has low bulk density and excellent mechanical strength and is suitable as a lagging product or a heat insulator.

2. Description of the Prior Arts

It has been known to prepare calcium silicate products by the following processes.

(1) A slurry is prepared by dispersing and mixing a siliceous source and a calcareous source and optionally inorganic materials such as clay, asbestos with water and the slurry is poured into a mold and cured in an autoclave (steam curing) and the cured product is taken out from the mold and dried.

(2) The slurry prepared by the process (1) is heated at 80° to 100° C. to obtain a gel and the gel is poured into a mold and molded by a press filter-molding and the product is taken out from the mold and cured in an autoclave by directly feeding steam (steam curing) and then, is dried.

(3) The slurry prepared by the process (1) is heated under higher pressure with stirring to crystallize and the resulting slurry containing crystalline calcium silicate hydrate is poured into a mold and the product is molded by a press filter-molding and taken out from the mold and dried.

When a calcium silicate product is used as a lagging product or a heat insulator, it is usually necessary to have high porosity that is, low bulk density in order to obtain a product having low thermal conductivity. However in the conventional processes, it has been difficult to obtain a product having low bulk density and high mechanical strength.

The inventors have found that the process for preparing a calcium silicate shaped product by press filter molding an aqueous slurry of a specific calcium silicate hydrate and steam-curing the molded product to transform the calcium silicate hydrate crystal, is effective to attain the desired process and have proposed in Japanese Patent Application 63621/1977 and U.S. Pat. No. 4,193,958.

The inventors have further studied to improve this process and have found that when the molded product obtained by press filter-molding is cured in a closed tank by dry-heating without feeding steam, uneven pressure and strain caused by the press filter molding are gradually released without sudden expansion of the molded product whereby a calcium silicate shaped product having excellent property without any crack can be prepared in stable operation.

SUMMARY OF THE INVENTION

It is an object of the present invention to provide a process for preparing a calcium silicate shaped product having low density and high mechanical strength without any crack.

The foregoing and other objects of the present invention have been attained by forming an aqueous slurry of calcium silicate hydrate by reacting a calcareous source with a siliceous source in water as a dispersion, under heating; and press filter molding the aqueous slurry to form a molded product having a bulk density of less than 0.6 g/cm$^3$; curing the molded product in a closed tank having a capacity of 1.5 to 30 times of the volume of the molded product at 140°–300° C. by dry-heating and then drying the cured product.

DETAILED DESCRIPTION OF THE PREFERRED EMBODIMENTS

In the process of the present invention, an aqueous slurry of calcium silicate hydrate, preferably tobermorite group compounds having the below-mentioned wet volume of more than 15 cm$^3$/g is prepared by reacting a siliceous source with a calcareous source in water as an aqueous dispersion under heating it.

Suitable siliceous sources include natural sources such as diatomaceous earth, quartzite and silicon dust; silica obtained by reacting aluminum hydroxide with hexafluorosilicic acid as a by-product in a wet process for producing phosphoric acid (hereinafter referring to as a wet process phosphoric acid by-product silica) and other industrial by-product silica.

The siliceous sources can be amorphous or crystalline form. It is preferable to use an amorphous siliceous source such as diatomaceous earth, the wet process phosphoric acid by-product silica and silicon dust because a slurry of calcium silicate hydrate having the wet volume of more than 15 cm$^3$/g is easily obtained.

Suitable calcareous sources include quick lime, slaked lime, carbide waste and other known sources.

The mole ratio of the calcareous source to the siliceous source as CaO/SiO$_2$ is usually in a range of 0.8 to 1.2 in the case of xonotlite as the hydrated calcium silicate in the shaped product and it is usually in a range of 0.7 to 1.0 in the case of tobermorite as the calcium silicate hydrate in the shaped product.

The amount of water used for dispersing the siliceous source and the calcareous source is more than 15 times by weight especially 17 to 40 times by weight to the solid content.

The aqueous slurry of calcium silicate hydrate can be usually obtained by reacting both sources dispersed in water at 80° to 230° C. for 30 minutes to 10 hours under heating. Various calcium silicate hydrates can be classified by the classification described in The Chemistry of Cements (Edited by H. F. W. Taylor, Department of Chemistry. University of Aberdeen, Scotland) Volume I P. 182, Table II.

In the process of the present invention, it is possible to use anyone of tobermorite group compounds such as tobermorite gel, C-S-H(II), C-S-H(I) and crystalline tobermorite and xonotlite. The calcium silicate hydrate causes the transformation in the order of tobermorite gel→C-S-H(II)→C-S-H(I)→11.3A tobermorite→xonotlite whereby suitable crystalline type can be easily obtained by controlling the reaction temperature and the reaction time. The direction of crystal transformation is shown by the arrow (→) and depends upon rising the reaction temperature or prolonging the reaction time. The tobermorite group compound is usually obtained by the reaction at the temperature for the first condition, whereas xonotlite is obtained if the reaction temperature is remarkably high or the reaction time is remarkably long. In the latter case, the reaction temperature is decreased or the reaction time is shortened. It is necessary to use tobermorite gel, C-S-H(I) or C-S-H(II) as the calcium silicate hydrate in an aqueous slurry if the crystalline tobermorite is desired as the crystal in the final shaped product.

In the process of the present invention, the calcium silicate hydrate in the aqueous slurry preferably has a wet volume of more than 15 cm$^3$/g.

The wet volume is calculated by the equation (I)

$$\text{wet volume} = V/W \tag{I}$$

wherein W represents a total weight of the calcareous source and the siliceous source and V represents a volume of solid components after 24 hours in a sedimentation of the aqueous slurry obtained by the reaction.

The wet volume is measured as follows. $W_1$ g of the aqueous slurry obtained by the reaction ($W_0$ g) is sampled and allowed to stand for 24 hours and the volume ($V_1$ cm$^3$) of the settled solid components is measured and the wet volume is calculated by the equation (II);

$$\text{wet volume} = V_1/(W_1 \times W/W_0) \tag{II}$$

wherein W represents a total weight of the equation (I).

In order to give the wet volume of more than 15 cm$^3$/g, the reaction is carried out at higher than 130° C. preferably 150° to 230° C. especially 160° to 210° C., under stirring. It is necessary to maintain the reaction system in a liquid condition whereby the reaction is carried out under higher pressure.

The resulting slurry is admixed with a reinforcing fibrous material and the mixture is molded by press filter-molding. The reinforcing fibrous material can be incorporated before the preparation of the slurry. The temperature and pressure in the press filter-molding are usually in ranges of 30° to 80° C. and 1 to 200 kg/cm$^2$G and the bulk density of the shaped product can be controlled by adjustment of piston stroke of the pressing machine. In the process of the present invention, the bulk density of the molded product is usually controlled to be lower than 0.6 g/cm$^3$ preferably in a range of 0.05 to 0.6 g/cm$^3$.

Various reinforcing fibrous materials can be used. Suitable reinforcing fibrous materials include asbestos, rockwool and glass fiber. The reinforcing fibrous material is usually incorporated at a ratio of 0.5 to 10 wt.%.

The resulting molded product is charged into a closed tank having pressure resistance such as an autoclave which has a capacity of 1.3 to 30 times, preferably 2 to 20 times of the volume of the molded product and is cured by dry-heating in the closed condition. In the curing treatment, it is heated by a heater etc. to provide the temperature of air in the tank of 140° to 300° C. preferably 160° to 220° C. especially 180° to 210° C. and to maintain the molding product in such atmosphere for about 2 to 20 hours.

In the process of the present invention, the molded product obtained by the press filter-molding has a bulk density of less than 0.6 g/cm$^3$. That is, the water content of the molded product is more than 60 wt.%. Such molded product is heated to generate steam from the molded product and the molded product is cured by the self-generated steam.

In accordance with the dry heat curing, it is necessary to attain the transformation from the molded product obtained by the press filter-molding of the aqueous slurry of tobermorite gel, C-S-H(I) or C-S-H(II) into crystalline tobermorite or xonotlite or from the molded product obtained by the press filter molding of the aqueous slurry of crystalline tobermorite into xonotlite.

When xonotlite is expected as the crystal of the final shaped product, it is heated to provide the temperature of air in the tank of 170° to 250° C. When tobermorite is expected as the crystal of the final shaped product, it is heated to provide 140° to 230° C.

As described above, in the process of the present invention, steam is not directly fed into the closed tank whereby any condensed water does not contact with the molded product before the growth of the crystal or the transformation and accordingly any sudden expansion of the molded product is not caused, and any crack is not caused.

The process of the present invention has been illustrated in detail. In accordance with the present invention, it is possible to obtain a calcium silicate shaped product having no crack and having high bending strength of 5 to 8 kg/cm$^2$ at the bulk density of about 0.10 g/cm$^3$ and having excellent dimension stability and thermal insulating property and has high refractoriness at the temperature of about 650° to 1000° C. Accordingly, the calcium silicate shaped product can be used in various fields such as refractory insulators and construction substrates.

The present invention will be illustrated by certain examples which are provided for purpose of illustration only and are not intended to be limiting unless otherwise specified.

EXAMPLE 1

A slaking was carried out by adding hot water to 43.2 wt. parts of quick lime (98% of CaO) and 46.8 wt. parts of ground quartzite (97.0% of SiO$_2$; 1.2% of Al$_2$O$_3$ and 0.09% of Fe$_2$O$_3$) (manufactured by Tokai Kogyo Co., Ltd.) was added to the slaked lime and water was added to give 30 times by weight of water to the solid content. The resulting suspension was stirred in an autoclave at 200° C. under the pressure of 15 kg/cm$^2$G for 2.5 hours to react them, whereby an aqueous slurry of the C-S-H(I) having the wet volume of 23 cm$^3$/g was obtained. The aqueous slurry was admixed with 3 wt. parts of an alkali resistant glass fiber and the mixture was heated at 70° C. and shaped by a press filter-molding at 70° C. under a pressure of 5 kg/cm$^2$ in a size of 200 mm×200 mm×30 mm under controlling a feed of the slurry so as to give a bulk density of 0.10, or 0.25 g/cm$^3$.

Each resulting molded product was charged in an autoclave having a capacity of three times of the molded product and was cured by heating in the autoclave at 200° C. by a heater for 7 hours. The pressure resulted by steam generated from the molded product was 10 kg/cm$^2$G. The molded product was transformed from C-S-H(I) into xonotlite crystal by the curing. The molded product was further dried at 150° C. for 6 hours.

The resulting shaped products had each bulk density of 0.10 or 0.25 g/cm$^3$ and each bending strength of 6.0 or 28 kg/cm$^2$ and had the same size as the sizes of the molded products obtained by the molded product formed by the press filter molding and had not any crack.

REFERENCE 1

In accordance with the process of Example 1, the aqueous slurry was controlled to give a bulk density of 0.25 g/cm$^3$ and press filter-molded, and the resulting molded product was charged in the autoclave having a capacity of three times of the molded product and cured by directly feeding steam under the condition of 180° C. and 10 kg/cm$^2$ for 7 hours to transform from C-S-H(I)

into xonotlite crystal. The molded product was further heated at 150° C. for 8 hours. The resulting shaped product had the same bending strength but had cracks on the side surface.

EXAMPLE 2

The aqueous slurry obtained by the process of Example 1 was controlled to give a bulk density of 0.10 g/cm³ and press filter-molded to form a lagging product for pipe-cover having an inner diameter of 90 mm, an outer diameter of 170 mm and a thickness of 40 mm. The molded product was charged in an indirect heating type autoclave equipped with a jacket and cured for 8 hours by maintaining the inner temperature at 180° C. by a heat medium system. The pressure resulted by steam generated from the molded product was 8 kg/cm²G. The molded product was transformed from C-S-H(I) into xonotlite crystal by the curing. The molded product was further dried at 150° C. for 8 hours. The resulting shaped product had a bulk density of 0.1 g/cm² and had the same size as the size of the molded product obtained by the press filter-molding and had not any crack.

REFERENCE 2

The molded product obtained by the press filter molding in Example 2 was heated in a dryer at 180° C. for 8 hours. The molded product was highly shrinked.

We claim:
1. A process for preparing a shaped calcium silicate product, comprising:
(a) forming an aqueous slurry of calcium silicate hydrate by heating and reacting a calcareous source with a siliceous source in water;
(b) admixing therewith reinforcing fibers molding resultant mixture into a shaped object having a bulk density of less than 0.6 g/cm³;
(c) curing said molded product in a closed tank having a capacity of 1.5 to 30 times the volume of said molded product at 140° to 300° C. by steam, the total amount of steam in said closed tank being generated from the water in said molded product; and
(d) drying said cured product.

2. The process of claim 1, wherein said molding step is a press filter-molding step.

3. The process of claim 1, wherein said aqueous calcium silicate hydrate slurry has a wet volume greater than 15 cm³/g, the wet volume being defined by the relationship:

$$\text{wet volume} = V/W,$$

wherein W is the total weight of the calcareous source and the siliceous source and V represents the volume of the solid components which have settled out from the aqueous slurry after the slurry has been allowed to settle for 24 hours.

4. The process of claim 1, wherein the mixing process of step (a) is conducted by mixing a reinforcing fibrous material with the siliceous source and the calcareous source, and wherein the molding process of step (b) is conducted by press filter-molding.

5. The process of claim 1, wherein the reaction of step (a) is conducted at a temperature of 150° to 230° C.

6. The process of claim 1, wherein said molding step is conducted by press filter-molding at a temperature of 30° to 80° C. under a pressure of 1 to 200 kg/cm²G thereby giving a molded product having a bulk density ranging from 0.05 to 0.6 g/cm³.

7. The process of claim 1, wherein said curing step (c) is conducted with an autoclave in which the molded product is heated at the indicated temperature for 2 to 20 hours.

8. The process of claim 7, wherein said autoclave has a capacity of 2 to 20 times the volume of said molded product.

9. The process of claim 7, wherein said autoclave is heated to a temperature of 160° to 220° C.

* * * * *